United States Patent [19]

Graham

[11] E Patent Number: Re. 32,616

[45] Reissued Date of Patent: Mar. 1, 1988

[54] TOWEL WARMER AND HOLDER

[76] Inventor: Joe Graham, P.O. Box 51, Milo, Iowa 50166

[21] Appl. No.: 892,305

[22] Filed: Aug. 4, 1986

Related U.S. Patent Documents

Reissue of:

[64] Patent No.: 4,559,442
Issued: Dec. 17, 1985
Appl. No.: 500,524
Filed: Jun. 2, 1983

[51] Int. Cl.[4] ..... H05B 1/00

[52] U.S. Cl. ..... 219/385; 219/521; 219/201; 219/540

[58] Field of Search ..... 34/243 R, 239; 219/385, 219/386, 387, 200, 521, 342, 201, 214, 540, 541

[56] References Cited

U.S. PATENT DOCUMENTS

| | | | |
|---|---|---|---|
| 1,570,778 | 1/1926 | Putnam | 219/391 |
| 1,659,719 | 2/1928 | Blake | 219/385 |
| 1,677,280 | 7/1928 | Gilbert | 219/521 |
| 2,571,918 | 10/1951 | Meninger | 219/521 |
| 2,662,965 | 12/1953 | Becker | 219/386 |
| 2,831,098 | 4/1958 | Lüscher | 126/275 E |
| 3,160,734 | 12/1964 | Rylander | 219/201 |
| 3,457,389 | 7/1969 | Knapp | 219/455 |
| 3,626,152 | 12/1971 | Governale | 219/521 |
| 3,849,629 | 11/1974 | Graham | 219/521 |
| 4,117,309 | 9/1978 | Cayley | 219/521 |

FOREIGN PATENT DOCUMENTS

| | | | |
|---|---|---|---|
| 390293 | 4/1933 | United Kingdom | 219/201 |
| 638203 | 6/1950 | United Kingdom | 219/342 |
| 1109363 | 4/1968 | United Kingdom | 219/342 |

*Primary Examiner*—E. A. Goldberg
*Assistant Examiner*—Teresa J. Walberg
*Attorney, Agent, or Firm*—Kent A. Herink; G. Brian Pingel

[57] ABSTRACT

[This invention relates to electric warming of towels, with] *An electric warmer of towels has* a vertical member providing support to a series of spaced parallel horizontal members which receive, store and warm the towels. The heating element, being a line type heater, is enclosed within the vertical support member and is connected to any appropriate standard A.C. power source.

4 Claims, 12 Drawing Figures

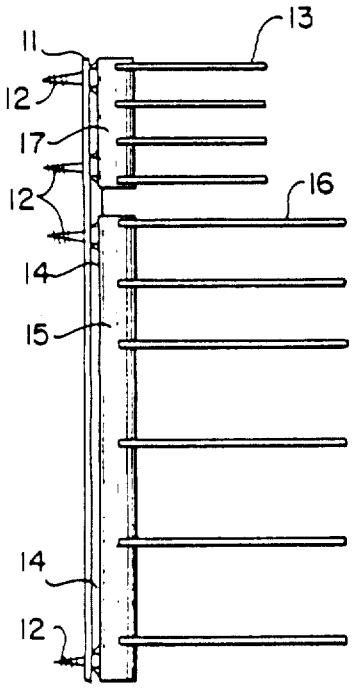
FIG. 1
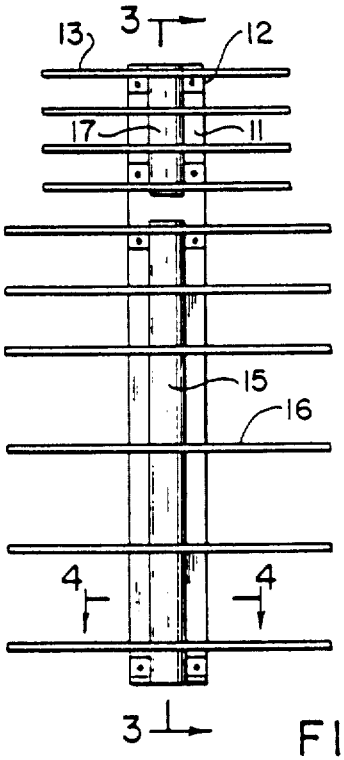
FIG. 2
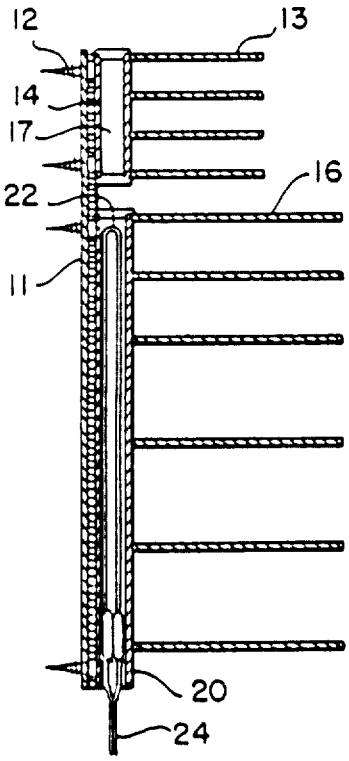
FIG. 3
FIG. 4
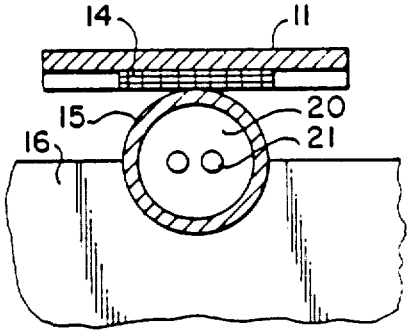
FIG. 5
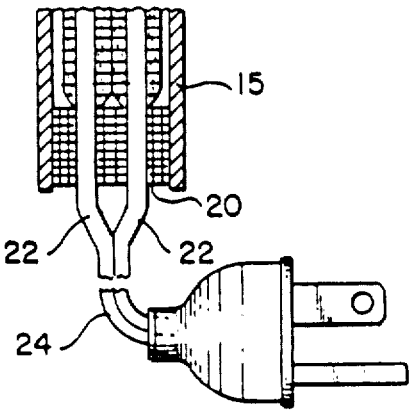

TOWEL WARMER AND HOLDER

Matter enclosed in heavy brackets [ ] appears in the original patent but forms no part of this reissue specification; matter printed in italics indicates the additions made by reissue.

*This is an application for Reissue of U.S. Pat. No. 4,559,442.*

BACKGROUND OF THE INVENTION

This invention relates to warming of towels which provide the user a soothing and warming experience when leaving the shower. Various forms of this device have been made with the majority being heated by light bulbs; see U.S. Pat. No. 3,849,629 by electric plates; see U.S. Pat. No. 3,457,389 or by vertical heating elements; see U.S. Pat. No. 4,117,309. The intent of all of these units were for use in motels or hotels to provide a desired and needed service to attract customers for these businesses. Such intent is most desirable but has not been achieved for various reasons. The present invention is designed with these intentions in mind and incorporates several features to overcome deficiencies of prior versions to achieve the aim of being commercially acceptable.

One object of the present invention is to provide a simple electrically heated towel warmer to be installed or to replace existing towel holders used in motels and hotels.

Another object of this invention is to provide an alternative heater for towels designed to hold towels and to be used primarily in new construction and be recessed into the bathroom wall.

Another object of this invention is to provide a unit which is simple to operate with no elaborate control system to control the heat applied to the towels.

Another object of this invention is to provide an alternative version for use in the home so the same comforts obtained from the commercial units are available in the home.

These and other objects, features and advantages of this invention will become more easily understood by reference to the drawings and detailed description.

BRIEF DESCRIPTION OF THE DRAWINGS

FIG. 1 is a perspective side view of an electrically heated holder for towels.

FIG. 2 is a perspective view of an electrically heated holder for towels.

FIG. 3 is a cross sectional view of the electrically heated holder taken substantially along line 3—3 FIG. 2.

FIG. 4 is a cross sectional view taken substantially along line 4—4 FIG. 2.

FIG. 5 is a cross sectional view of the heater element insert in the vertical member.

DESCRIPTION OF THE PREFERRED EMBODIMENT

Figure 6:
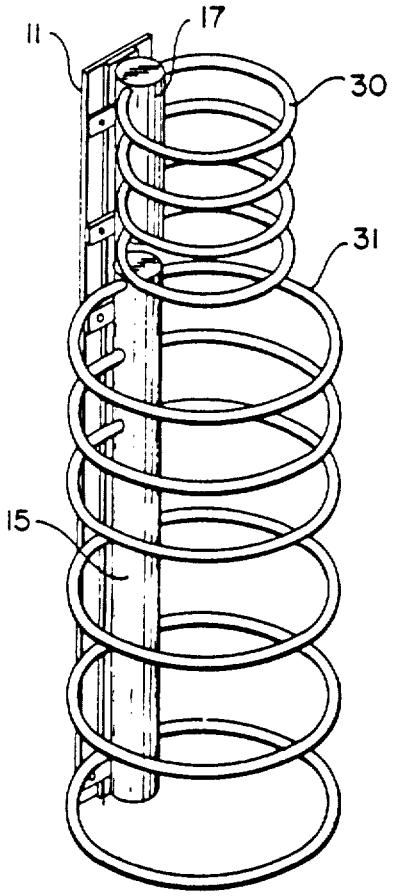
FIG. 6 is a perspective view of an alternative design of the invention.

Referring now to the drawings, this improved towel warmer and holder is shown in FIG. 1 and is designed to be mounted on the wall in the bathroom area of a motel or hotel facility by common wood screws (12) of sufficient length and strength to support the vertical support member (11); attached to this member by welding means is a vertical tube (15) containing a heating element (22 in FIG. 2), affixed to the vertical support tube (15) are a series of horizontal spaced apart plates (13) and (16); plates (13) are of a size to accommodate wash cloths and by means of separation in the vertical support member (15) are not heated; plates (16) are of a size sufficient to accommodate bath towels (not shown) when folded in the customary manner. A resistance line heater wire (22) FIG. 2, when connected to a standard 110 a.c. volt outlet heats the vertical support tube (15) which transmits the heat by conduction to the horizontal plates (16) thereby warming the towels. The vertical support tube (15) and horizontal plates (16) are made of a highly conductive material such as aluminum. The vertical support tube (15) is insulated by insulation barriers (14) from the vertical support member (11) thereby preventing heat transfer to the wall of the bathroom. A soft plug (20) in FIG. 4, is used to seal the bottom of the vertical support tube (15) to prevent heat from escaping. Line heater wires (22) exit the support tube (15) thru holes (21) in the soft plug (20) and have sufficient length to be connected to a common electrical outlet as previously described. Under normal operating conditions the heat generated by the line heater (22) and transmitted to the horizontal plates (16) is sufficient to warm towels to a comfortable degree yet not present a danger to the user by touching the plates (16).

Figure 7:
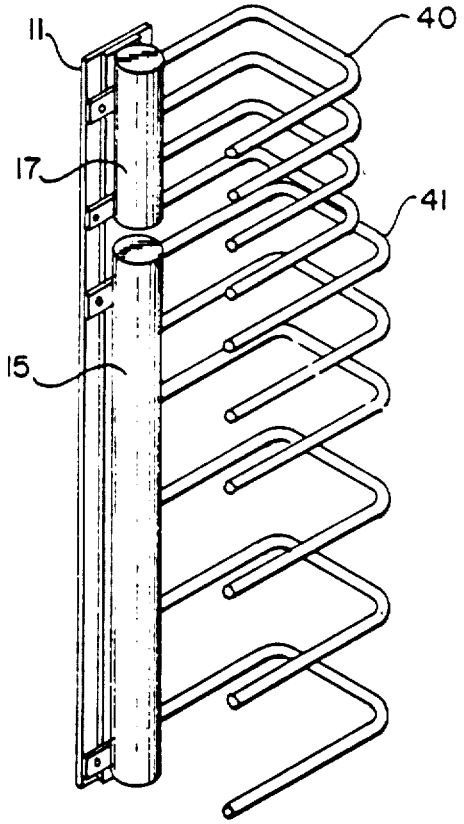
FIG. 7 is a perspective view with portions missing to show another alternative design of the invention.

FIGS. 6 and 7 present alternative designs of the same basic concept except that horizontal circular tubes (31) in FIG. 6 and rectangular shaped tubes (41) in FIG. 7 are filled with a liquid which is warmed by a resistance line heater (as in the preferred embodiment) which heats a vertical support tube (15) which in turn heats, by conduction means, the liquid contained in the horizontal tubes (31) and (41) respectfully.

Figure 8:
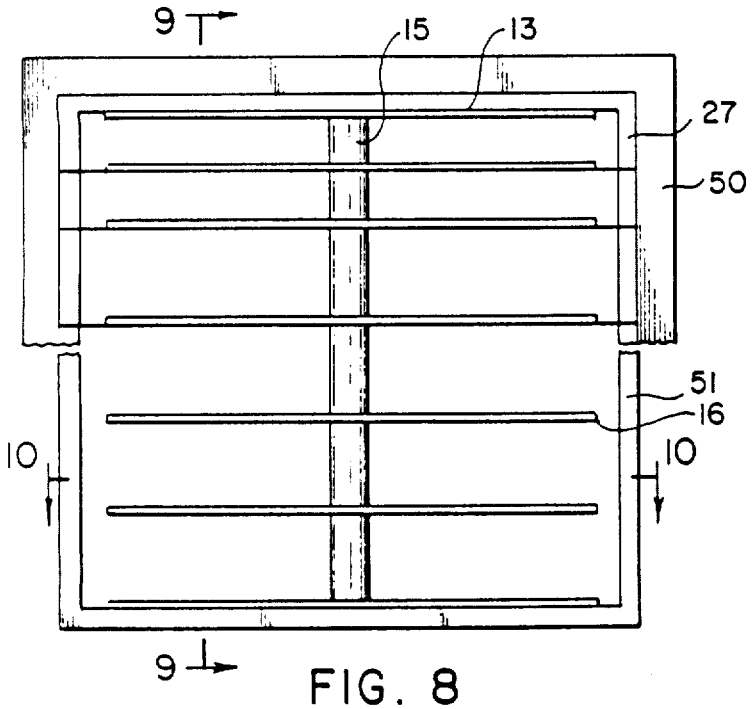
FIG. 8 is a perspective view of an alternative installation of the invention.
Figure 9:
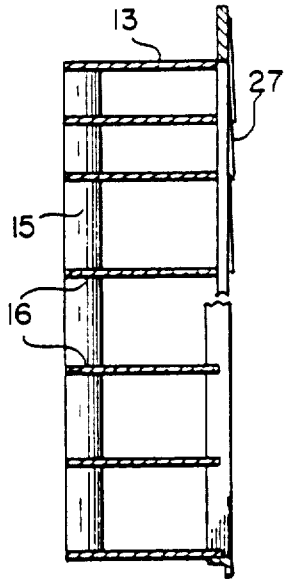
FIG. 9 is a cross sectional view taken substantially along line 9—9 of FIG. 8.
Figure 10:
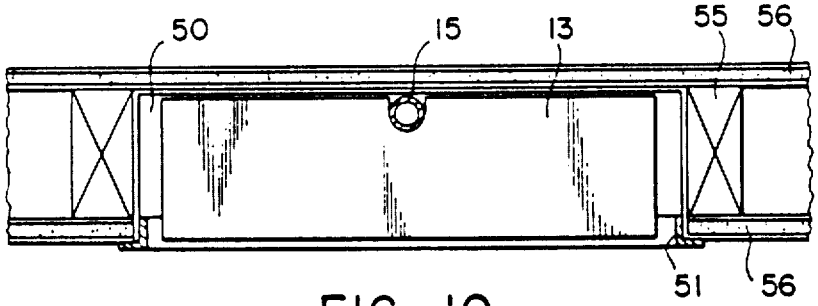
FIG. 10 is a cross sectional view taken substantially along line 10—10 FIG. 8.

Thus far the preferred embodiment, FIG. 1, of the device and the alternative versions, FIGS. 6 and 7 have been designed to be mounted on the interior wall of a bathroom as replacements of the standard towel holders now used in motels and hotels. FIGS. 8, 9, and 10 provide for an alternative installation of the invention for use primarily in new construction. These views portray the device installed by recessing it into the bathroom wall. Standard studding (55) FIG. 10 is shown with a recessed opening (50) being shaped to accommodate the device. The device is mounted to the rear wall (56) by the same method described previously. In this version flaps (27) are mounted on the exterior of the plates (13) and (16) to provide a smooth and decorative appearance in the room. Each opening for towels has an individual flap.

Figure 11:
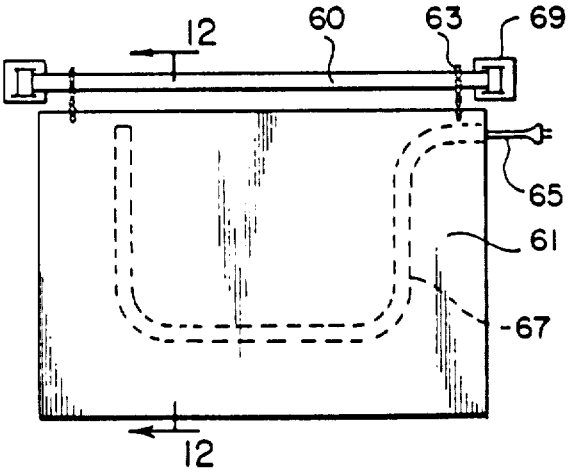
FIG. 11 is a perspective view of an alternative design of the invention for use in a home.
Figure 12:
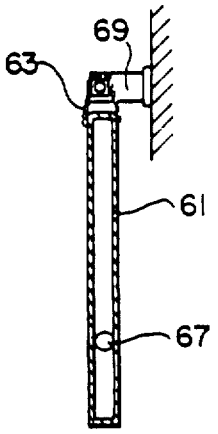
FIG. 12 is a cross sectional view taken substantially along line 12—12 FIG. 11.

A home version of the device is shown in FIGS. 11 and 12. In this version two vertically mounted sheets of aluminum (61) contain a shaped tube (67) which in turn contains a line resistance heater wire (65). The heater wire (65), when connected to a standard 110 volt a.c. outlet, common to all households, heats the shaped tube (67) which heats, by conduction, the sheets (61) in turn heating the towel which is draped over the sheets. Support chains (63) removably affix the device to a standard home towel rack (69).

In describing the preferred embodiment, certain terms and specifications have been used; these are used in a generic sense and not for purposes of limitation.

Having thus fully described the preferred embodiment of the invention and the alternative designs of the same:

That which is claimed is:

1. A device for warming and holding towels comprising in combination:

a single, solid vertical support means, attached thereto, by bonding means, a single hollow vertical support means;

attached to the hollow vertical support means, by bonding means, a plurality of horizontal, spaced apart holding means;

contained within the hollow vertical support means, a heating means for the purpose of heating the hollow vertical support means and the plurality of horizontal spaced apart holding means;

the horizontal holding means are spaced apart a sufficient vertical distance to receive and store a folded towel;

attached to each horizontal holding means is a flap, of sufficient size to reach the next lower horizontal holding means.

*2. A rack assembly for simultaneously holding and warming a plurality of towels, said assembly comprising:*

*(a) a heater support member at the rear of the rack assembly that is vertically aligned and is formed from a material having a high coefficient of thermal conductivity;*

*(b) at least two vertically spaced apart plates formed from a material having a high coefficient of thermal conductivity and attached to said heater support member to extend outwardly therefrom for forming an open front pocket into which a towel may be positioned for being heated by surface-to-surface contact with said plates;*

*(c) means for attaching said plates to said support member as to permit thermal conductivity therebetween; and*

*(d) an electrical heating means mounted in fixed position adjacent said heater support member along substantially all of the vertical height of said support member for conductive heating of said support member and said plates attached thereto.*

*3. A rack assembly as recited in claim 2, wherein said assembly further comprises:*

*(a) a thermal insulating barrier having one side attached to said heater support member and an opposite side; and*

*(b) a rear support member attached to the opposite side of said insulating barrier.*

*4. A rack assembly as recited in claim 2, wherein said rack assembly is adapted for installation in a recessed portion of a wall of a room.*

• • • • •